United States Patent [19]
Yokomizo

[11] Patent Number: 4,924,509
[45] Date of Patent: May 8, 1990

[54] IMAGE PROCESSING APPARATUS

[75] Inventor: Yoshikazu Yokomizo, Saitama, Japan

[73] Assignee: Canon Kabushiki Kaisha, Tokyo, Japan

[21] Appl. No.: 319,817

[22] Filed: Mar. 6, 1989

Related U.S. Application Data

[63] Continuation of Ser. No. 22,513, Mar. 9, 1987, abandoned, which is a continuation of Ser. No. 611,124, May 17, 1984, abandoned.

[30] Foreign Application Priority Data

May 25, 1983 [JP] Japan .................................. 58-92074

[51] Int. Cl.⁵ ............................................... G06K 9/36
[52] U.S. Cl. ...................................... 382/50; 358/456
[58] Field of Search .................. 382/9, 18, 48, 50, 51, 382/53, 62; 358/455, 456, 457

[56] References Cited

U.S. PATENT DOCUMENTS

| | | | |
|---|---|---|---|
| 3,225,213 | 12/1965 | Hinrichs et al. | 382/53 |
| 4,208,677 | 6/1980 | Schayes et al. | 358/280 |
| 4,251,837 | 2/1981 | Janeway, III | 382/50 |
| 4,414,581 | 11/1983 | Kato et al. | 358/280 |
| 4,418,423 | 11/1983 | Tsuii et al. | 382/57 |
| 4,447,830 | 5/1984 | Stoffel | 358/283 |
| 4,485,408 | 11/1984 | Kamizyo et al. | 358/283 |
| 4,495,522 | 1/1985 | Matsunawa et al. | 358/280 |
| 4,501,016 | 2/1985 | Persoon et al. | 382/53 |
| 4,547,811 | 10/1985 | Ochi et al. | 358/280 |
| 4,709,274 | 11/1987 | Tanioka | 358/283 |

FOREIGN PATENT DOCUMENTS

| | | |
|---|---|---|
| 2516332 | 10/1976 | Fed. Rep. of Germany . |
| 3225415A1 | 2/1983 | Fed. Rep. of Germany . |
| 1549739 | 8/1979 | United Kingdom . |
| 2105554A | 3/1983 | United Kingdom . |

*Primary Examiner*—Leo H. Boudreau
*Attorney, Agent, or Firm*—Fitzpatrick, Cella, Harper & Scinto

[57] ABSTRACT

An image processing apparatus comprises a memory for dividing an input image data into a plurality of blocks and storing information on the image data of each block, a plurality of processing circuits for processing the input image data in predetermined processing methods, a plurality of delay circuits for delaying the image data processed by the processing circuits, and a selector for selecting one of the delay circuits in accordance with the output of the memory.

32 Claims, 8 Drawing Sheets

(A) | A0 | A1 | A2 | A3 | -------- 3b | A1023 |

(B) 4n+1 | 10 |

(C) 4n+2 | 10 |

(D) 4n+3 | 15 |

(E) 4n+4 | 15 |

IMAGE PROCESSING APPARATUS

This application is a continuation of application Ser. No. 022,513, filed Mar 9, 1987, now abandoned, which is a continuation of application Ser. No. 611,124, filed May 17, 1984, now abandoned.

BACKGROUND OF THE INVENTION

1. Field of the Invention

The present invention relates to an image processing apparatus in an electronic file, a facsimile or a digital copying machine, and more particularly to an image processing apparatus having a function to discriminate an image content.

2. Description of the Prior Art

In an image processing office equipment such as a facsimile or a copying machine, there are two inconsistent demands, one being sharp reproduction of a boundary of black and white areas of an image such as a character or a graphic image and the other being gray level reproduction with a vignette boundary of black and white areas of an image such as a photographic image.

The former of these two inconsistent demands has been satisfied by increasing a resolution power of the image of the apparatus and the latter has been substantially satisfied by a dither method recently developed as digital technology advanced.

However, an original image which a user inputs to the office equipment is not always limited to a binary image such as characters or graphic patterns or a gray level image such as photograph but in many cases it includes a mixture of the binary image and the gray level image. Since it is very difficult to separate the binary image area and the gray level image area of the original text which includes the mixture of the binary image and the gray level image, the original text has been processed either by a binary recording technique (in which an image data is binarized by a predetermined threshold and recorded by ON dots and OFF dots) or a gray level recording technique (in which the image data is binarized by a dither matrix and recorded by ON dots and OFF dots). However, the binary recording has the advantages that it can sharply reproduce the characters and graphic pattern and readily enable band compression encoding of a transmission signal but it has a disadvantage in that it is difficult to reproduce a gray level image such as a photograph with a high quality. On the other hand, the dither method can reproduce a gray level of a gray level image but has a poor resolution power and hence the quality of image is low for the binary images such as characters. Accordingly, when the original image including a mixture of gray level images and binary images is processed by one or the other of gray level recording and binary recording, only one of these types of images can be reproduced with high quality.

In order to resolve the above problem, it has been proposed to use the systematic dither method in the gray level image area and the binary processing method in the binary image area such as characters or pattern to reproduce a high quality of image.

In this case, however, an image memory which has a one-to-one correspondence to pixels read from the original image is necessary in order to discriminate the binary image area and the gray level image area. Accordingly, depending on the size of the image to be processed, the pixel density and the number of gray levels to be processed, the memory capacity increases and a complex circuit is required. As a result, the cost of the memory increases, the reliability of the apparatus is reduced and the operation of the memory is complicated.

SUMMARY OF THE INVENTION

It is an object of the present invention to provide an image processing apparatus which can 0 discriminate and process images with a small capacity of memory.

It is another object of the present invention to provide an image processing apparatus which can reproduce an original image containing a binary image such as characters and a gray level image such as a photograph, with a high quality.

It is another object of the present invention to provide an image processing apparatus having an image discrimination function and a high processing speed with a low cost.

It is a further object of the present invention to provide an image processing apparatus which can record a large number of gray levels without increasing the memory capacity of delay means and hence without increasing the cost, and which is highly reliable and simple in memory operation.

The other objects of the present invention will be apparent from the following description taken in conjunction with the accompanying drawings.

DETAILED DESCRIPTION OF THE PREFERRED EMBODIMENTS

Figure 1:
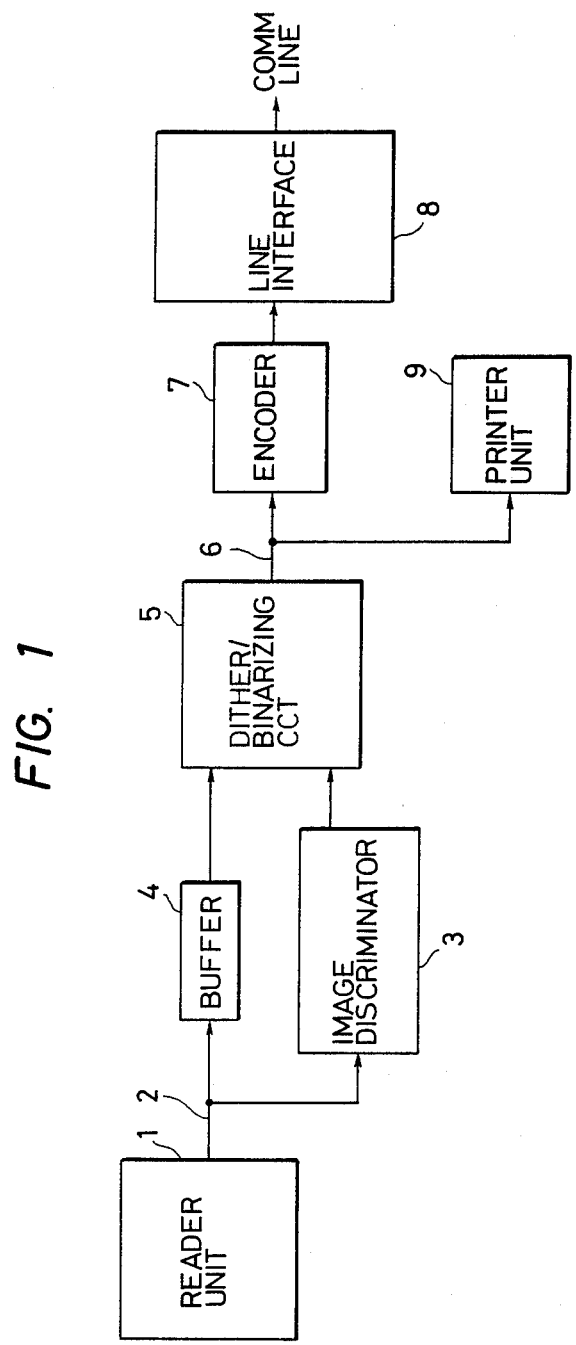
FIG. 1 shows a configuration of an image processing apparatus having an image discrimination function.
Figure 2:
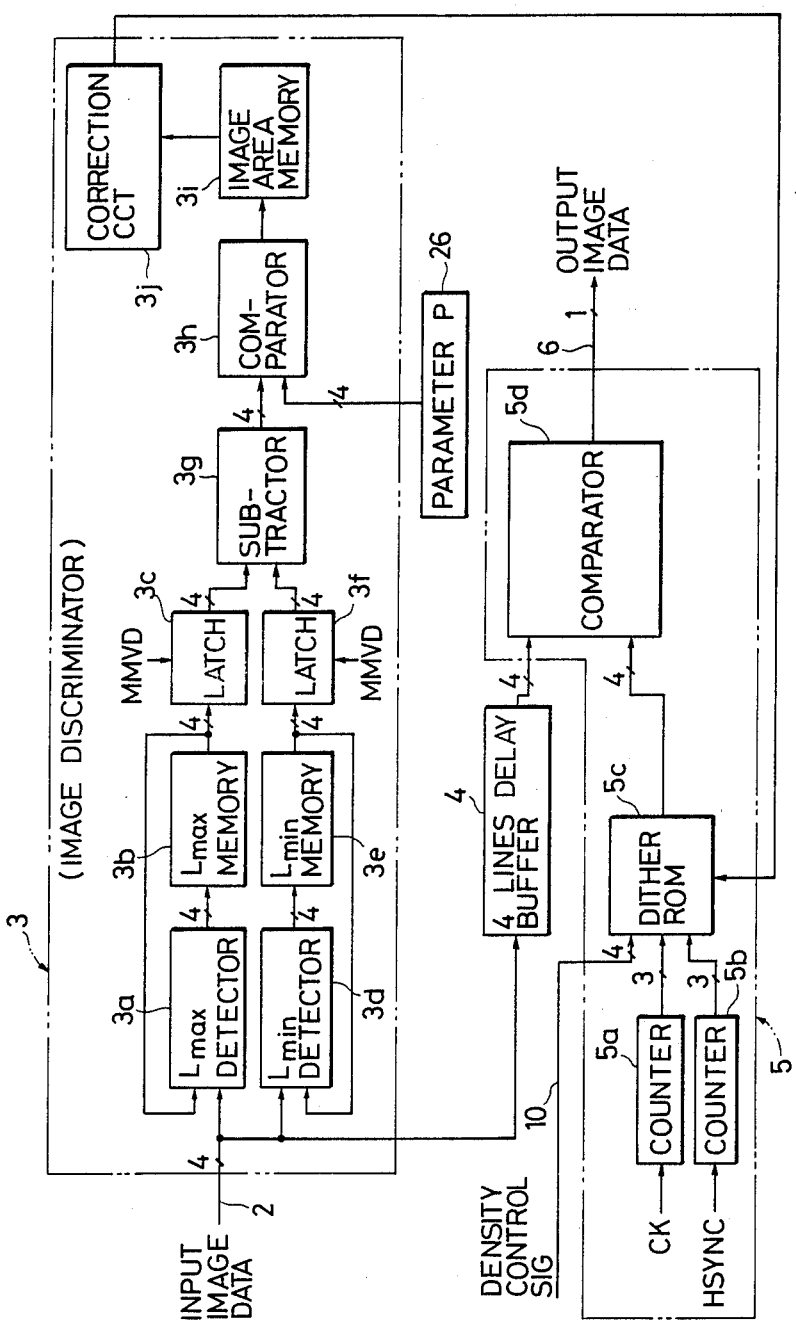
FIG. 2 is a detailed diagram of a main portion of FIG. 1.
Figures 3A, 3B:
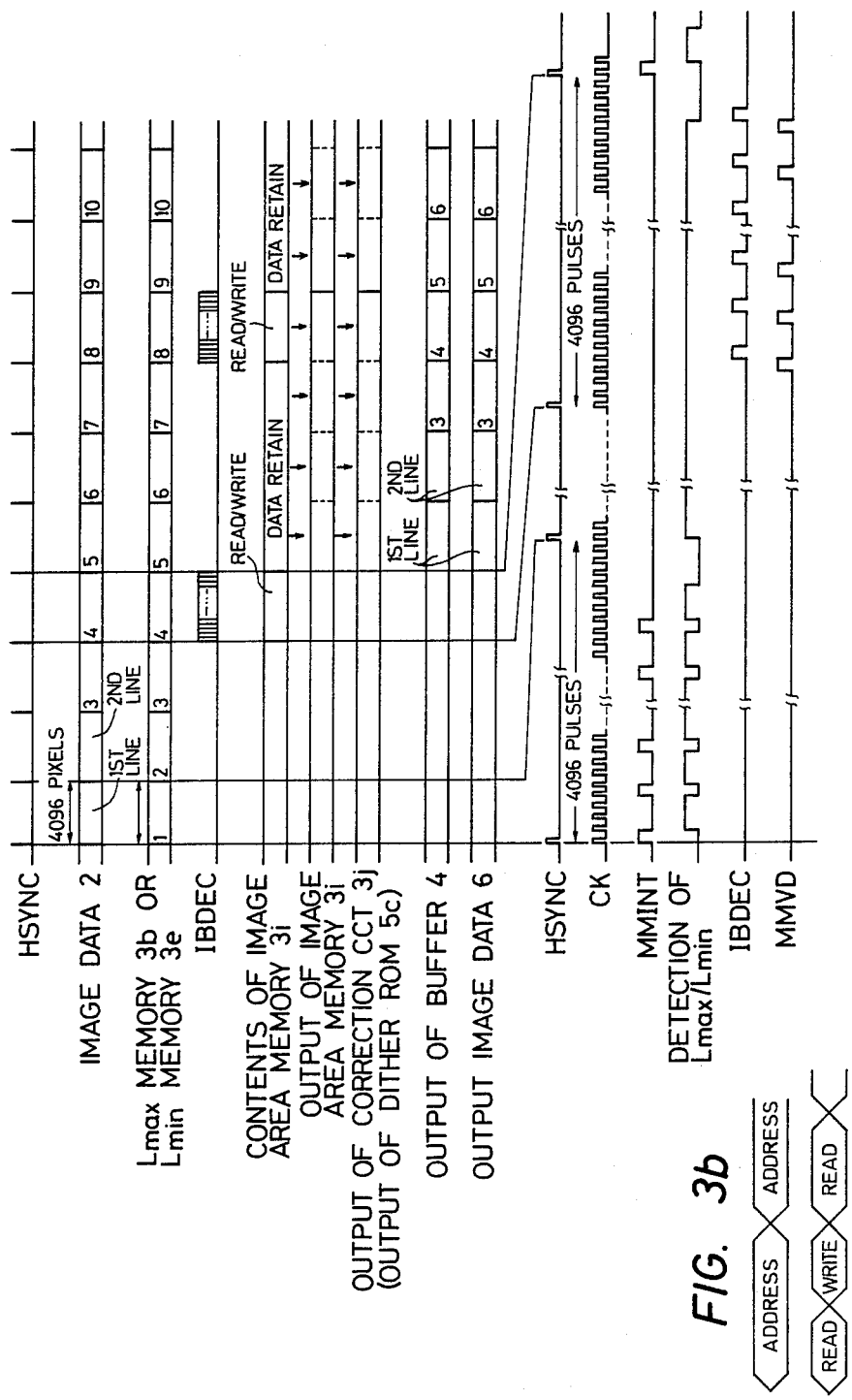
FIG. 3a is a time chart for operation of FIG. 2.
FIG. 3b shows an operation timing of an image area memory 3i.

Referring to FIGS. 1 to 3, an image processing apparatus which reproduces a gray level image with a high quality without degrading a binary image such as characters is explained.

FIG. 1 shows a block diagram of the image processing apparatus.

Numeral 1 denotes a reader which scans an original image 1 from left to right (main scan) and from bottom to top (sub-scan) to produce an image data and numeral 2 denotes an input image data from the reader 1. For a 16-gray level image, the input image data is sequentially produced as a 4 bits/pixel signal. Numeral 3 denotes an image content discriminator connected to the reader 1. It processes the input image data signal 2 from the reader 1 and separates it into a binary display area and a gray level display area. Numeral 4 denotes a buffer connected to the reader 1. It temporarily delays the image data output from the reader 1 to synchronize it with the output from the image content discriminator 3. Numeral 5 denotes a dither/binarizing circuit for dither-processing or binarizing the image data delayed by the buffer 4 in accordance with the output of the image content discriminator 3. The output 6 from the dither/binarizing circuit 5 includes both the dither-processed data and the binarized data. Numeral 7 denotes an encoder for encoding the output 6, numeral 8 denotes a line interface for an external communication line, and numeral 9 denotes a printer for reproducing the read original image.

Referring to FIG. 2, configurations of the image content discriminator 3 and the dither/binarizing circuit 5 are explained.

The image content discriminator 3 will be explained first. Numeral 2 denotes the image data signal which is a 4-bit parallel signal. Numeral 3a denotes a MAX detector for detecting a maximum level (L max) of a pixel density of each block, numeral 3b denotes a MAX memory for storing an output of the MAX detector 3a. It stores a 4-bit density level information for each of blocks which are equal in number to the number of pixels in one main scan line divided by four. An output from the MAX memory 3b is fed back to an input of the MAX detector 3a so that the L max in the same block of immediately previous main scan line is compared with the pixel density of the current main scan line. The output of the MAX memory 3b is also supplied to an input of a subtractor 3g through a latch 3c. Numeral 3d denotes a MIN detector for detecting a minimum level (L min) of a pixel density of each block, and numeral 3e denotes a MIN memory for storing an output of the MIN detector 3d. An output of the MIN memory 3e is supplied to a latch 3f and fed back to an input of the MIN detector 3d so that the L min in the same block of immediately previous main scan line is compared with the pixel density of the current main line. Numeral 3g denotes the subtractor which calculates a difference between the output L max of the latch 3c and the output L min of the latch 3f, that is, (L max-L min), and numeral 3h denotes a comparator which compares the difference (L max-L min) calculated by the subtractor 3g with a predetermined image content discrimination parameter P. The result of the comparison is stored in an image area memory 3i. The image content discrimination parameter P is supplied from a parameter circuit 26. Numeral 3j denotes a correction circuit for correcting an output of the image area memory 3i. Those circuits form the image content discriminator 3.

The dither/binarizing circuit 5 is next explained. Numerals 5a and 5b denote counters to which a basic clock CK for each pixel and a main scan synchronizing signal HSYNC are applied, respectively, to produce an address of a dither ROM 5C. The HSYNC is synchronized with a horizontal synchronizing signal BD of a laser beam printer. In addition to the basic clock CK and the main scan synchronizing signal HSYNC, the output of the correction circuit 3j and a density adjustment signal 10 are also applied to the dither ROM 5c as the address. Numeral 5d denotes a comparator for comparing the output of the buffer 4 with pixel threshold stored in the dither ROM 5C. Those circuit form the dither/binarizing circuit 5. The operation of the image processing apparatus constructed as shown above is now explained assuming that the reader 1 main-scans and sub-scans the original image to read it in 16 tones, a 4-bit pixel data is produced for each pixel and the reader 1 produces a 4-bit parallel image data signal. The image content discriminator 3 divides the image into 4×4 pixel blocks, detects L max and L min for each block, calculates (L max-L min) and compares it with the image content discrimination parameter P to separate the image to a binary display area and a multi-value display area (gray level display area).

That is, when (L max-L min) $\geq$ P, the binary display area is discriminated, and when (L max-L min) < P, the multi-value display area is discriminated. The result is stored in the memory of the image content discriminator 3. The binary display area is represented by "1" and the multi-value display area is represented by "0".

On the other hand, the image data signal 2 delayed by the buffer 4 by the processing time of the image content discriminator 3 is binarized when the output of the image content discriminator 3 is "1", and dither-processed when the output is "0". Thus, the image data signal is binarized or dither-processed for each 4×4 pixel block in accordance with the discrimination output of the image content discriminator 3. The dither ROM 5c produces a threshold for the binarization when the output of the correction circuit 3i is "1", and produces 16 thresholds represented by a 4×4 matrix for the dither processing when the output is "0". The image signal 6 thus produced is a serial image data signal which is binarized or dither-processed for each four pixels in the main scan direction. The image signal 6 in encoded by the encoder 7 and then sent out to the communication line through the line interface 8. The printer 9 is used when a copy of the original image is to be made simultaneously with the transmission of the image or when a copy of the original image is to be simply made.

The operation of the image content discriminator 3 and the dither/binarizing circuit 5 shown in FIG. 2 is explained with reference to the time chart of FIG. 3.

The image data signal 2 is applied one line (main scan line) at a time in synchronism with the main scan synchronizing signal HSYNC. The pixels in each line are represented by the 4-bit parallel (16 tones) data synchronized with the basic clock CK. The main scan synchronizing signal HSYNC clears counters (not shown) which generate timing signals MMINT, IBDEC and MMVD shown in FIG. 3.

When the image data signal 2 of the first line is applied, the first pixel data in each image area (block) is forcibly stored in the MAX memory 3b and the MIN memory 3e at the timing of MMINT. When the pixel data at the timing of other than MMINT is applied, the pixel data is compared, for each block, with the tentative L max and L min stored in the MAX memory 3b and the MIN memory 3e, by the MAX detector 3a and the MIN detector 3d, respectively, so that a higher density pixel data is stored in the MAX memory 3b and a lower density pixel data is stored in the MIN memory 3e. In this manner, the maximum pixel density for each four pixels (block) is stored in the MAX memory 3b and the minimum pixel density is stored in the MIN memory 3e, and the detection of the first line is terminated. Thus, if an original document of size B4 is read at a density of 16 pixels/mm, 4096 pixels are present per line, and for the 4×4 pixel block, 1024 block areas are present for each four lines. Thus, the MAX memory 3b and the MIN memory 3e are constructed by 1024×4 bits RAM's, respectively.

When the image data signal 2 of the second line is processed, the density is compared for each block, not at the timing of MMINT. Accordingly, instead of forcibly storing the first pixel of each image area in the MAX memory 3b and the MIN memory 3e, the pixel density of the second line is compared, for each block, with the maximum and the minimum of each image area stored in the MAX memory 3b and the MIN memory 3e and a higher density and a lower density are stored in the MAX memory 3b and the MIN memory 3e, respectively, at the end of the processing for the second line, the maximum density and the minimum density of the two lines of pixels, i.e. eight pixels are stored in the MAX memory 3b and the MIN memory 3e, respectively. Similarly, at the end of the processing for the forth line the maximum density and the minimum density for each of 1024 image areas are stored in the MAX memory 3b and the MIN memory 3e. In the processing for the fourth line, the maximum density and the minimum density for each image area are finalized at the timing of MMV shown in FIG. 3. Thus, at this timing, the finalized maximum density and the minimum density are latched in the latches 3c and 3f, respectively, the difference (L max-L min) is calculated by the subtractor 3g, the difference is compared with the image content discrimination parameter P by the comparator 3h, and "1" is written into the image area memory 3i at the timing of IBDEC if (L max-L min) is larger than the parameter P and "0" is written if (L max-L min) is smaller than the parameter P. In this manner, the data is written into the image area memory 3i simultaneously with the processing of the image data signal of the fourth line.

The image data signal of the fifth or subsequent line is processed in the same manner as the fourth line and the data is written into the image area memory 3i.

The data in the image area memory 3i is read out during the processing of the image data of the fifth line by an image area memory read clock which is generated at every fourth basic clock CK, and the same data as that read during the processing of the fifth line is repeatedly read out during the processing of the sixth and seventh lines. During the processing of the eighth line, the image area memory 3i sequentially writes and read data a shown by the RAM operation timing of FIG. 3b. It writes a new image area data while it reads out the data of the same content as the data read during the processing of the fifth to seventh lines. In the eighth or subsequent line, the same processing as described above is carried out.

The data of the image area memory thus read out is corrected by the correction circuit 3j to improve an image quality, and then applied to an address terminal of the dither ROM 5c to generate the dither threshold pattern together with the outputs of the counters 5a and 5b.

The density adjustment signal 10 is a control signal which shifts the dither threshold up or down to improve the image quality of the image recording. It is supplied from a control panel through a control circuit (not shown).

The dither ROM 5c produces the threshold pattern in accordance with the image content discrimination output of the correction circuit 3j. When the output of the correction circuit 3j is "0", the dither ROM 5c produces a predetermined dither pattern, and when the output is "1", it produces a threshold pattern which has all "7" thresholds (i.e. binarization). The output of the buffer 4 which was delayed by four lines is compared with the threshold for each pixel by the comparator 5d so that the image output signal 6 is produced.

In the image processing apparatus described above, when the gray level image such as photograph and the binary image such as characters or graphic pattern are included in one original image, the gray level image area is processed by the dither method and the binary image area is processed by the binary recording method to reproduce the original image with a high quality.

However, in order to achieve the above image processing apparatus, the buffer 4 as the memory means needs a memory capacity having one-to-one correspondence to the pixels. Accordingly, the memory capacity increases depending or the size of image to be handed, the pixel density and the number of gray levels to be recorded.

For example, when the original sheet of size B4 is read at a density of 16 pixels/mm with each pixel represented in one of 16 tones, it is necessary to delay the 4-bit weighted image signal by four main scan lines in the buffer 4. Accordingly, a memory capacity of (4 bits $\times 4096) \times 4 = 64$ K bits is required.

An embodiment of the image processing apparatus of the present invention having a reduced memory denotes capacity is explained with reference to FIGS. 4 and 5. The like elements to those shown in FIGS. 1 and 2 are designated by the like numerals and the explanation thereof is omitted.

Figure 4:
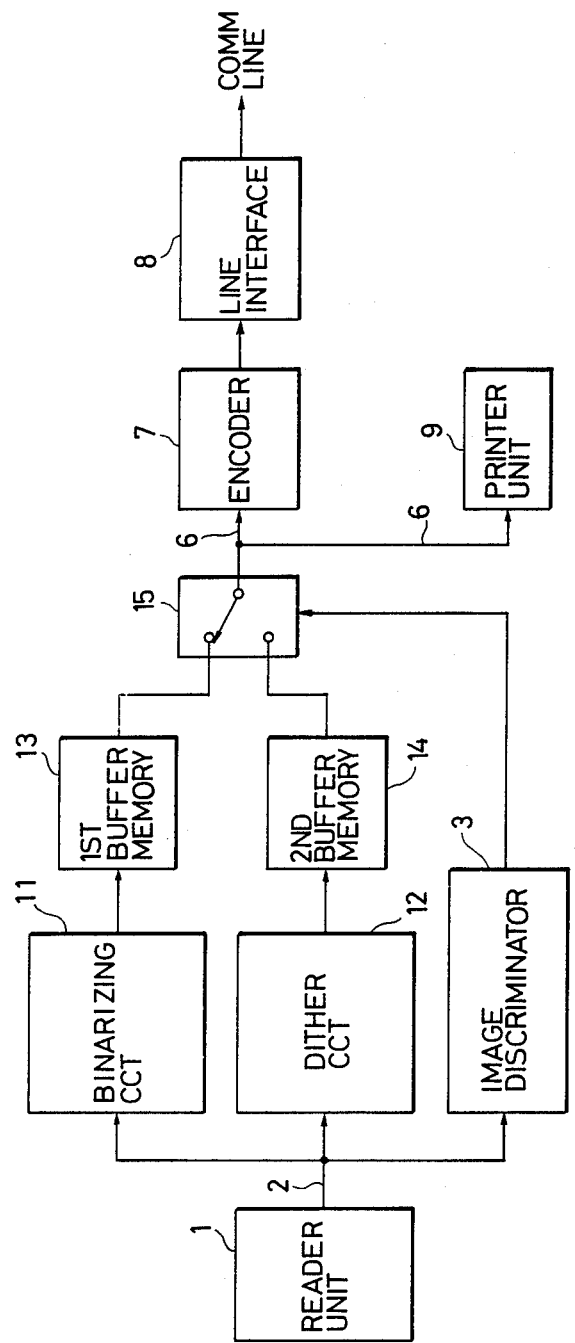
FIG. 4 is a block diagram of one embodiment of the image processing apparatus of the present invention.

Referring to FIG. 4 which shows an overall configuration, numeral 11 denotes a binarizing circuit connected to a reader 1 for binarizing an image data signal 2 outputted from the reader 1. Numeral 12 denotes a dither circuit connected to the reader 1 for dither-processing the image data signal 2 outputted from the reader 1. Numeral 13 denotes a first buffer connected to the binarizing circuit 11 for delaying the output of the binarizing circuit 11 to synchronize it with an output from an image content discrimination circuit 3. Numeral 14 denotes a second buffer connected to the dither circuit 12 for delaying the output from the dither circuit 12 to synchronize it with the output of the image content discrimination circuit 3. Numeral 15 denotes a data selector which selects one of the output from the first buffer 13 and the output from the second buffer 14 in accordance with the output of the image content discriminator 3. An output image signal 6 from the data selector 15 is sent out to a communication line through an encoder 7 (for example, MH encoder) and a line interface 8. The line interface may include a memory which can store one text page of coded data as required.

The output image signal 6 is also supplied to a printer 9 as required. The printer 9 is provided to make a copy of the original image read by the reader 1 and may be a laser beam printer.

The output from the encoder 7 may be stored in a disk file.

Figure 5:
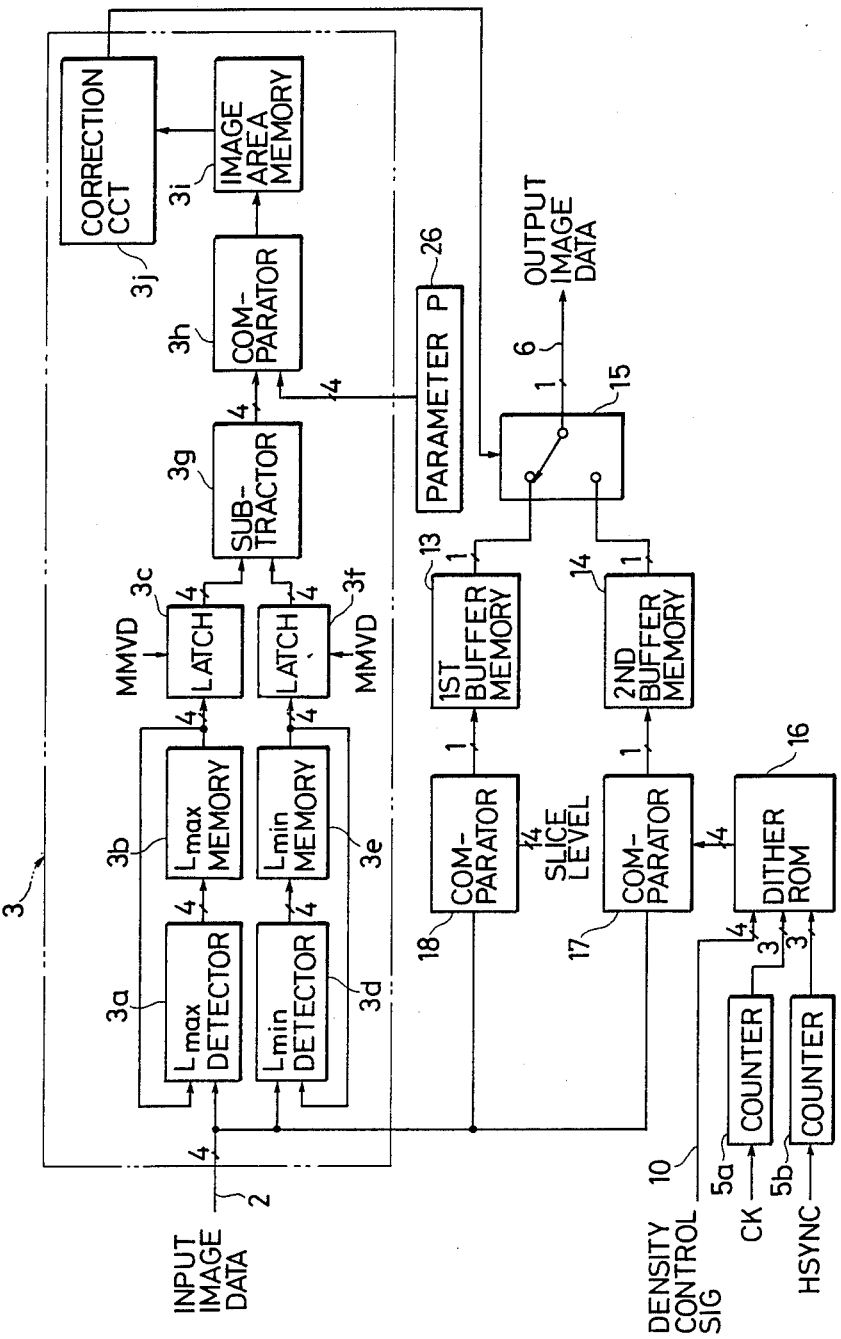
FIG. 5 is a detailed diagram of a main portion of FIG. 4.

FIG. 5 shows a detail of a main portion of FIG. 4. Numeral 16 denotes a dither ROM to which outputs of counters 5a and 5b which count a basic clock CK and a main scan synchronizing signal HSYNC, respectively, are applied. The dither ROM 16 produces a predetermined threshold pattern. Numeral 17 denotes a second comparator which compares the threshold pattern produced by the dither ROM 16 with the image data 2 from the reader 1. The output of the second comparator 17 is delayed by the second buffer 14. Numeral 18 denotes a first comparator which compares the image data signal 2 from the reader 1 with a constant slice level. The output of the first comparator 18 is delayed by the first buffer memory 13. A dither ROM (having a threshold pattern of all same values) may be connected to the comparator 18, or other constant threshold circuit may be connected thereto. Comparing FIGS. 4 and 5, the comparator and a constant threshold circuit (not shown) corresponds to the binarizing circuit 11, and the comparator 17, the dither ROM and the counters 5a and 5b correspond to the dither circuit 12.

Other portions of the circuit are identical to those shown in FIGS. 1, 2 and 4 and hence the explanation thereof is omitted.

The operation of the image processing apparatus described above is now explained.

In FIGS. 4 and 5, the image data signal 2 outputted from the reader 1 is parallelly supplied to the binarizing circuit 11, the dither circuit 12 and 5 the image content discriminator 3. The image data signal 2 supplied to the binarizing circuit 11 is compared with the constant slice level by the first comparator 18 of the binarizing circuit 11 and binarized, and the binarized data is temporarily stored in the first buffer 13. On the other hand, the image data signal supplied to the dither circuit 12 is compared with the threshold pattern read from the dither ROM 16 by the second comparator 17 of the dither circuit 12 and dither-processed, and the dithered data is temporarily stored in the second buffer 14. The image data signal 2 supplied to the image content discriminator 3 is discriminated for the binary image or the gray level image for each block as is done in the prior art apparatus, and the discrimination result is supplied to the image area memory 3i as a signal "1" or "0". The data selector 15 is switched by this signal so that one of the binarized image data signal and the dithered image data signal is supplied to the encoder 7 or the printer 9.

The image data signal binarized or dithered by the binarizing circuit 11 or the dither circuit 12 has one bit per pixel. Accordingly, when the original sheet of size B4 is read at a density of 16 pixels/mm with each pixel being in one of 16 tones, and if the original sheet is divided into 4×4 pixel blocks, it is necessary to delay the signal by four lines in the first buffer 13 and the second buffer 14.

Accordingly, a memory capacity required by the first buffer 13 and the second buffer 14 is $(1 \times 4096) \times 4 \times 2 = 32$ K bits, which is one half of the memory capacity required by the image processing apparatus of FIGS. 1 and 2.

In the above description, the memory capacity of the image processing apparatus of FIGS. 1 and 2 and the memory capacity of the present image processing apparatus were compared for the case where the pixels are read in 16 tones, and the saving factor was $\frac{1}{2}$. When the pixels are read in a higher number of tones such as 32 tones or 64 tones, the image processing apparatus of FIGS. 1 and 2 needs the memory capacity of $(5 \times 4096) \times 4 = 80$ K bits  (1)

$(6 \times 4096) \times 4 = 96$ K bits  (2)

On the other hand, in the present image processing apparatus, the image signal 6 after the processing by the binarizing circuit 11 and the dither circuit 12 has one bit per pixel whatever the number of tone of the pixels read may be. Accordingly, the necessary memory capacity remains as that for 16 tones, that is, 32 K bits.

Accordingly, the memory capacity required by the present image processing apparatus can be saved to compare with the memory capacity required by the image processing apparatus of FIGS. 1 and 2 by factors of $\frac{1}{2}.5$ and $\frac{1}{3}$ as the number of tones increases to 32 and 64. As the size of the original sheet increases, saving factor is increased accordingly.

Figure 6:
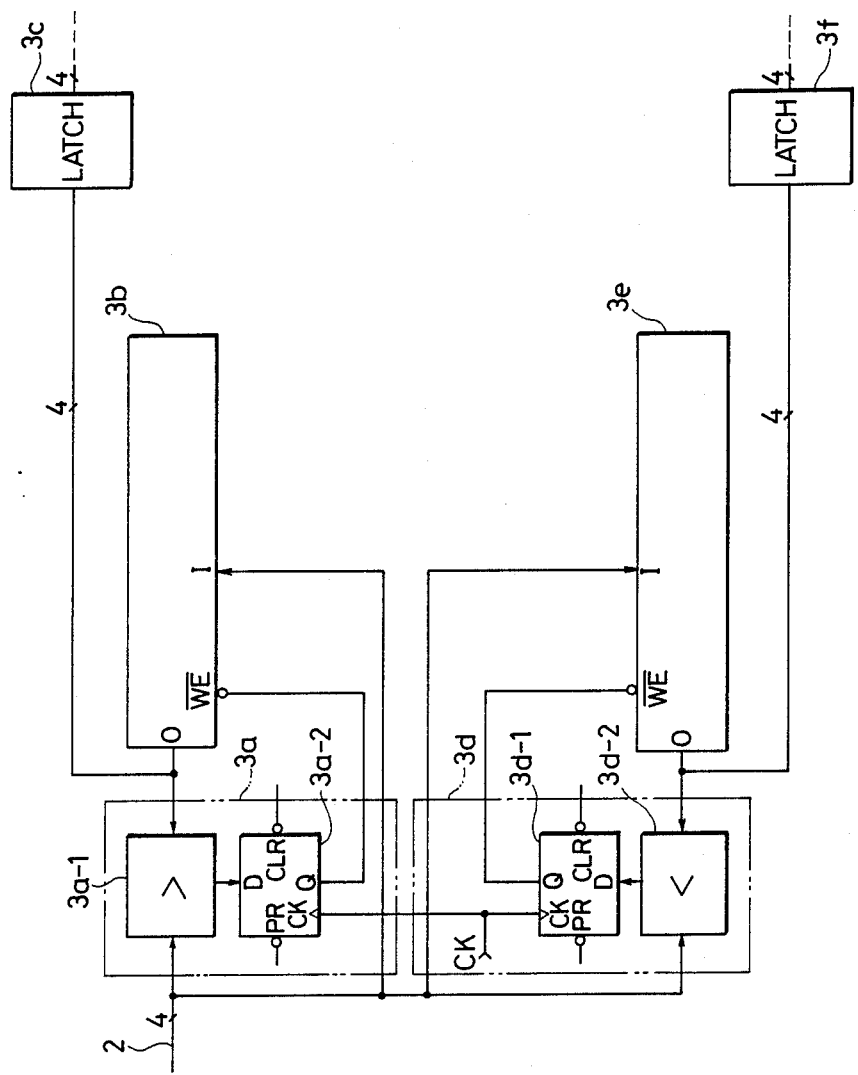
FIG. 6 shows a MAX detector 3a, a MAX memory 3b, a MIN detector 3d and a MIN memory 3e.

FIG. 6 shows details of the MAX detector 3a, MAX memory 3b, MIN detector 3d and MIN memory 3e. Numeral 3a-1 and 3d-1 denote comparators and numeral 3a-2 and 3d-2 denote flip-flop (F/F).

The RAM 3b the comparator 3a-1 and the F/F 3a-2 divide the sequentially read 4-bit image density data 2 into 4×4 pixel unit blocks, and in each block, the maximum pixel density L max is detected.

The detection of the L max is explained with reference to FIGS. 7 and 8.

Figures 7, 8:
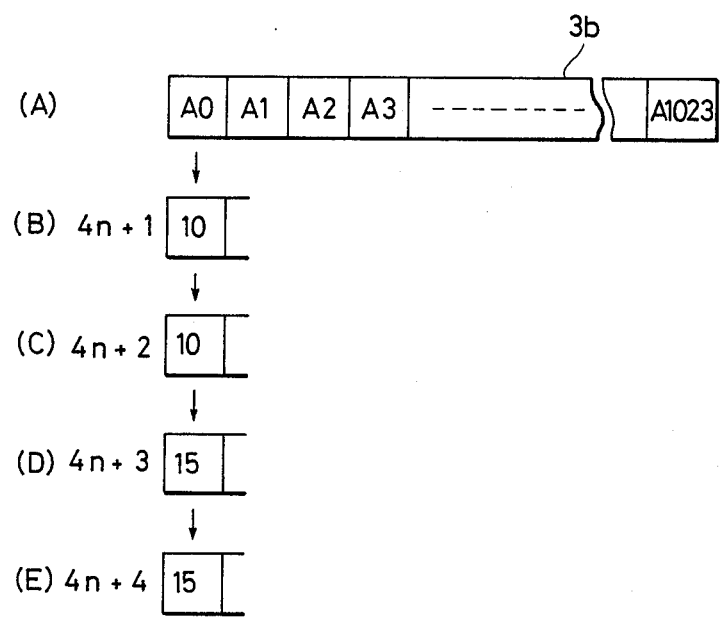
FIG. 7 shows pixel densities of an original image.
FIG. 8 shows regions of the MAX memory 3b and FIG. 9 shows sectional views of a reader 1 and a printer 9.

FIG. 7 shows pixels densities read by a solidstate image sensor such as a CCD sensor and A/D converted by an A/D converter (not shown), arranged to correspond to the original image.

FIG. 8 shows a memory area of the MAX memory 3b. As shown in FIG. 8A, the MAX memory 3b has a data storage space for the image data read at the density of 16 pixels/mm in the main scan direction from the original sheet having a length of 256 mm in the main scan direction, and divided into 4-pixel blocks, that is, image areas A0–A1023.

In FIG. 7, arrows H and V indicate the main scan direction and the sub-scan direction, respectively, of the original sheet, and $A_0$, $A_1$, ... denote 4×4=16-pixel unit blocks (image areas).

Let us assume that when the CCD main-scans the (4n+1)th line, the image data 2 of 3→7→10→10→8→9→... are sequentially supplied to the comparator 3a-1 and the MAX memory 3b. The comparator 3a-1 sequentially compares the image data sequentially supplied thereto with the data stored in the MAX memory 3b, and if the pixel density of the supplied data is higher, the output of the comparator 3a-1 is held by the F/F 3a-2 and the MAX memory 3b is set to the write mode.

When the initial data in the (4n+1)th line is supplied to the comparator 3a-1, it is unconditionally written into the MAX memory 3b as an initial value of the image area in which the initial data is contained. Thus, in FIG. 7 the density data "3" is written as the initial value of the image area A0, and the data "8" is written as the initial value of the image area A1. In the image area A0, when the next data "7" in the (4n+1)th line is supplied to the comparator 3a-1, the initial value "3" stored in the MAX memory 3b is read out and the both data are compared. Since 7>3, the content of the MAX memory 3b is changed from "3" to "7".

Similarly, when the next data "10" is supplied, the content of the MAX memory 3b is again updated, and at the end of the transfer of the 4-pixel data contained in the memory area A0 in the (4n+1)th line, the maximum value "10" of the four pixels is stored in the MAX memory 3b at the address corresponding to the image area A0, as shown in FIG. 8b.

Similarly, at the end of the scan of the image area A1 in the (4n+1)th line, the maximum value "9" is stored in the MAX memory 3b. The above process is repeated 1024 times for all memory areas on the (4n+1)th line, and at the end of the process, 1024 data are stored at respective addresses of the MAX memory 3b as the maximum values L max of the respective memory areas on the (4n+1)th line.

In the scan of the (4n+2)th line, the image data are sequentially compared with the maximum values of the respective image areas on the (4n+1)th line. Thus, at the end of the process for the (4n+2)th line, the data "10" is written into the area of the MAX memory $3b$ corresponding to the area A0, as the maximum value, as shown in FIG. 8C.

Similarly, at the ends of the processes for the (4n+3)th line and the (4n+4)th line, the data "15" is stored as shown in FIGS. 8D and 8E.

The data "15", which is the maximum L max of the image area A0, is read out of the MAX memory $3b$ before the initial value "12" is written into the same address of the MAX memory $3b$ in the process for the [4(n+1)+1]th line and it is supplied to the subtractor $3g$ through the latch $3c$.

The MIN memory $3e$, the comparator $3d$-2 and the F/F $3d$-1 detect the minimum L min of the densities in the image areas in the same manner as the maximum L max detection process by the MAX memory $3b$, the comparator $3a$-1 and the F/F $3a$-2.

Figure 9:
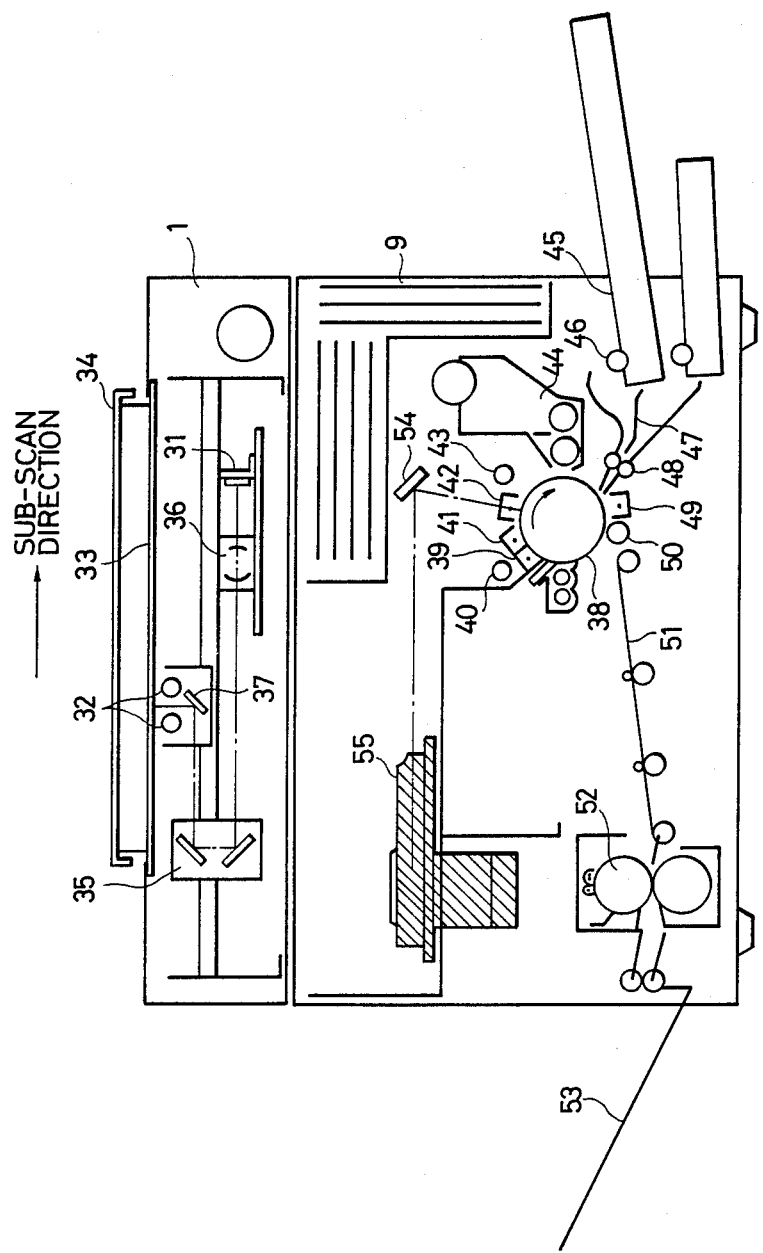

FIG. 9 shows a sectional view of the reader 1 and the printer 9 shown in FIG. 4. The original sheet is placed faced down on an original sheet glass 33. A mounting reference is located at inner left side as viewed from the front. The original sheet is pressed to the original sheet glass by an original sheet cover 34, and illuminated by a fluorescent lamp 32. A reflection light is focused onto a CCD 31 through mirrors 35 and 37 and a lens 36. The mirror 37 and the mirror 35 are relatively moved at a speed ratio of 2:1. The optical unit is moved from left to right at a constant speed while it is PLL-controlled by a DC servo motor. The speed of movement is 180 mm/sec in a forward run in which the original sheet is illuminated, and 468 mm/sec in a return run.

The printer 9 located under the reader 1 in the FIG. 9 is explained. The bit-serial image signal 6 processed by the dither/binarizing circuit 5 is supplied to a laser scan optical unit 55 of the printer. The unit comprises a semiconductor laser, a collimater lens, a rotating polygon mirror, an F-$\theta$ lens and a correcting optical system. The image signal from the reader is applied to the semiconductor laser and electro optically converted thereby, and a diversing laser beam is collimated by the collimater lens, and the collimated beam is directed to the polygon mirror rotating at a high speed so that the laser beam is scanned onto a photosensitive material 38. The polygon mirror is rotated at 2600 rpm.

The laser beam from the unit is directed to the photosensitive material 38 through a mirror 54.

The photo-sensitive material 38 is made by a three-layer structure consisting of, for example, a conductive layer, a photo-sensitive layer and an insulative layer. Process components for forming an image are arranged therearound. Numeral 39 denotes a pre-discharger, numeral 40 denotes a pre-discharge lamp, numeral 41 denotes a primary charger, numeral 42 denotes a secondary charger, numeral 43 denotes a flat exposure lamp, numeral 44 denotes a developing unit, numeral 45 denotes a paper cassette, numeral 46 denotes a paper feed roller, numeral 47 denotes a paper feed guide, numeral 48 denotes a registration roller, numeral 49 denotes a transfer charger, numeral 50 denotes a separation roller, numeral 51 denotes a convey guide, numeral 52 denotes a fixing unit and numeral 53 denotes a tray.

Since operations of those process components are well known, the explanation thereof is omitted.

While the binarizing circuit 11 and the dither circuit 12 are used in the present embodiment, any other dot data conversion circuits may be used in parallel. By selecting the outputs of those dot data conversion circuits in accordance with the output of the image area memory, a higher quality of image can be reproduced. In this case, at least two parameters P are necessary and at least two bits are required for each image area of the image area memory. The dither circuit may be replaced by other gray level processing circuit.

The image data 6 may be outputted such that a dot size is changed to improve the tonality of the gray level output when the image is discriminated as the multi-value display area.

In the dither processing (dither conversion) used in the present embodiment, each pixel of the input image data is compared with each threshold of the dither matrix to produce the 1-bit output image data. Alternatively, the dither processing in which each pixel of the input image data is compared with a plurality of thresholds of the dither matrix may be used.

In the present embodiment, the comparator 17 and the dither ROM 16 are used for the dither processing. Alternatively, the dither processing may be carried out by a memory which is addressed by the input image data. The binarizing process may also be carried out by a memory.

While the monochromatic image processing has been described in the present embodiment, the present invention is applicable to the color-by-color dither processing.

While the maximum value and the minimum value of the image data are stored for each block and the difference therebetween is calculated to discriminate the image content in the present embodiment, the present invention is not limited thereto. Alternatively, the maximum value of the image data is stored for each block and a difference between the maximum value and a predetermined value may be calculated to discriminate the image content. Further alternatively, approximates of the maximum value and the minimum value of the image data for each block may be stored.

The image content discriminator used in the present invention is not limited to that shown in FIG. 5, but other circuit may be used provided that it discriminates the image on real time.

While the buffers 13 and 14 are used in the present embodiment, shift registers, or CCD delay lines may be used instead.

While the buffers 13 and 14 are serially read and written (read after write) in the present embodiment, buffers which are selectively read and written (double buffer) may be used.

As described hereinabove, according to the present invention, the input image data is converted to the dot data and buffered while it is discriminated for each block. Accordingly, the memory capacity is saved and the high quality of image is reproduced at a high speed on real time.

In accordance with the present invention, the processing time shift of the image content discriminator is corrected by providing at least two buffers capable of storing four lines of dot data, and the dither processing and the binarizing processing are carried out for the input image data on real time. Accordingly, the image processing apparatus which can process the image at a high speed with a low cost is provided.

In accordance with the present invention, the image data is binarized and dithered, the results are stored in the memory means and one of the results stored in the memory means is selectively read out in accordance with the output of the discrimination means which discriminates whether the image is the gray level image or the binary image. Accordingly, even if the number of tones of the gray levels to be recorded is large, the memory capacity of the memory means need not be increased, and even if the size of the original sheet or the pixel density is increased, only a small amount of increase of the memory capacity is required.

Accordingly, the present invention provides the image processing apparatus which is of low cost, highly reliable and simple in memory operation.

The present invention is not restricted to the illustrated embodiments but many modifications may be made within a scope of the claims.

What I claim is:

1. An image processing apparatus comprising:
input means for inputting pixel data sequentially;
first process means for halftone processing the pixel data from said input means;
second process means for non-halftone processing the pixel data from said input means;
first buffer means for delaying the pixel data processed by said first process means;
second buffer means for delaying the pixel data processed by said second process means, said second buffer means being different from said first buffer means;
discrimination means for discriminating whether the inputted pixel data represents a halftone image or a non-halftone image, said discrimination means performing discrimination operation thereof for each block, each block comprising a plurality of pixel data; and
selecting means for selecting one of outputs from said first and second buffer means in accordance with the result of the discrimination operation of said discrimination means,
wherein each of said first and second buffer means is capable of storing the processed pixel data of plural lines associated with said block so as to delay the processed pixel data in correspondence to the discrimination operation of said discriminating means.

2. An apparatus according to claim 1, wherein said first process means includes dither process means for performing dither conversion of said pixel data by using a predetermined threshold matrix and said second process means includes means for binarizing said pixel data by using a fixed threshold.

3. An apparatus according to claim 1, wherein said input means includes scanning means for scanning an original image to input the pixel data sequentially; wherein said discrimination means includes extracting means for extracting a respective predetermined value from each said block of the pixel data in parallel with scanning by said scanning means, and memory means for storing the predetermined value of the pixel data for each said block, said extracting means comparing the sequentially inputted pixel data of said block with said predetermined value relating to said block to set a new predetermined value and store the new predetermined value in said memory means in accordance with the comparison result; and wherein said discrimination means discriminates whether said block represents a halftone image or a non-halftone image on the basis of the predetermined value.

4. An apparatus according to claim 3, wherein said predetermined value is a maximum value or a minimum value of said block.

5. An apparatus according to claim 4, wherein said memory means includes first memory means and second memory means for storing the maximum value and minimum value, respectively, and wherein said discrimination means includes operating means for performing an operation on the maximum value and the minimum value and discriminates whether said block represents a halftone image of a non-halftone image in accordance with the result of the operation by said operation means.

6. An apparatus according to claim 1, wherein said first and second buffer means delay the processed pixel data correspondingly to discriminating operation by said discrimination means.

7. An apparatus according to claim 1, wherein said each block comprises a plurality of pixel data arranged in two dimensions.

8. An apparatus according to claim 1, wherein said first process means halftone processes the pixel data of m bits (m>1) from said input means to output processed pixel data of one bit.

9. An apparatus according to claim 8, wherein said second process means non-halftone processes the pixel data of m bits (m>1) from said input means to output processed pixel data of one bit.

10. An apparatus according to claim 9, wherein said first and second buffer means are adapted to store the pixel data of one bit from said first and second process means, corresponding to predetermined lines, respectively.

11. An image processing apparatus comprising:
read means for reading a document by scanning the document to output pixel data;
first process means for halftone processing the pixel data from said read means;
second process means for non-halftone processing the pixel data from said read means;
first buffer means for delaying the pixel data processed by said first process means;
second buffer means for delaying the pixel data processed by said second process means, said second buffer means being different from said first buffer means;
discrimination means for discriminating whether the pixel data from said reading means represents a halftone image or a non-halftone image, said discrimination means performing discrimination operation thereof for each of a plurality of blocks arranged in a main-scan direction of said read means, each said block having a plurality of pixel data arranged in two dimensions, said discrimination means sequentially receiving the pixel data, for each line, from said read means and discriminating whether said block represents halftone image or non-halftone image in synchronism with input of the pixel data corresponding to the last line of the block; and
selecting means for selecting the processed data from one of said first and said second buffer means in accordance with the result of the discrimination operation of said discrimination means, wherein each of said first and second buffer means is capable of storing the processed pixel data of plural lines associated with said block so as to delay the processed pixel data in accordance to the discrimination operation of said discrimination means.

12. An apparatus according to claim 11, wherein said first process means includes dither process means for performing dither conversion of said pixel data by using a predetermined threshold matrix and said second process means includes means for binarizing said pixel data by using a fixed threshold.

13. An apparatus according to claim 11, wherein said discrimination means includes extracting means for extracting a predetermined value for each said block of the pixel data in parallel with scanning by said reading means, and memory means for storing the predetermined value of the pixel data for each said block, said extracting means comparing the sequentially received pixel data of said block with said predetermined value relating to said block to set a new predetermined value and store the new predetermined value in said memory means in accordance with the comparison result; and wherein said discrimination means discriminates whether said block represents a halftone image or a non-halftone image on the basis of the predetermined value.

14. An apparatus according to claim 13, wherein said predetermined value is a maximum value or a minimum value of said block.

15. An apparatus according to claim 14, wherein said memory means includes first memory means and second memory means for storing the maximum value and minimum value, respectively, and wherein said discrimination means includes operating means for performing an operation on the maximum value and the minimum value and discriminates whether said block represents a half-tone image or a non-half-tone image in accordance with the result of the operation by said operation means.

16. An apparatus according to claim 11, wherein said first and second buffer means delay the processed pixel data correspondingly to discriminating operation by said discrimination means.

17. An apparatus according to claim 11, wherein said first process means halftone processes the pixel data of m bits (m>1) from said read means to output processed pixel data of one bit, and said second process means non-halftone processes the pixel data of m bits (m>1) from said read means to output processed pixel data of one bit.

18. An apparatus according to claim 17, wherein said first and second buffer means are adapted to store the pixel data of one bit from said first and second process means, corresponding to predetermined lines, respectively.

19. An apparatus according to claim 11, wherein said select means selects one of the processed pixel data from said first and second buffer means, before completion of document scan by said read means, in accordance with the discrimination result by said discrimination means.

20. An apparatus according to claim 11, wherein said select means selects one of the processed pixel data from said first and second buffer means, after output of a predetermined lines of pixel data by said read means, in accordance with the discrimination result by said discrimination means.

21. An image processing apparatus comprising:
input means for inputting pixel data;
first process means for halftone processing the pixel data from said input means;
second process means for non-halftone processing the pixel data from said input means;
first buffer means for delaying the pixel data processed by said first process means;
second buffer means for delaying the pixel data processed by said second process means, said second buffer means being different from said first buffer means;
discrimination means for discriminating image contents of the pixel data from said input means on the basis of a predetermined value of the pixel data in a block comprising a plurality of pixel data,
said discrimination means including memory means for storing the predetermined value of the pixel data for each said block, and setting means, operable in parallel with actuation by said input means, for comparing the sequentially inputted pixel data of said block with said predetermined value relating to said block to set a new predetermined value and store the new predetermined value in said memory means in accordance with the comparison result; and
select means for selecting the processed pixel data from one of said first and second buffer means in accordance with the discrimination result obtained by said discrimination means, wherein each of said first and second buffer means is capable of storing the processed pixel data of plural lines associated with said block so as to delay the processed pixel data in correspondence to discrimination operation of said discriminating means.

22. An apparatus according to claim 21, wherein said discrimination means discriminates whether the pixel data from said input means represents a halftone image or a non-halftone image.

23. An apparatus according to claim 22, wherein said first and second buffer means delay the processed pixel data correspondingly to discriminating operation by said discrimination means.

24. An apparatus according to claim 23, wherein said first and second process means perform halftone process and non-halftone process of the pixel data of m bits (m>1) from said input means to output processed pixel data of one bit, respectively.

25. An apparatus according to claim 24, wherein said first process means includes dither process means for performing dither conversion of said pixel data by using a predetermined threshold matrix and said second process means includes means for binarizing said pixel data by using a fixed threshold.

26. An apparatus according to claim 22, wherein said discrimination means discriminates whether the pixel data from said input means represents a halftone image or non-halftone image for each block, and wherein said predetermined value is a minimum value or maximum value of the pixel data in said block.

27. An image processing apparatus comprising:
input means for inputting pixel data;
first memory means for storing a first predetermined value of pixel data for each block, each said block comprising a plurality of pixel data;
second memory means for storing a second predetermined value of pixel data for each block;
extracting means for extracting the first predetermined value and the second predetermined value for each said block in parallel with actuation of said input means to store the extracted values in said first and second memory means, respectively, said extracting means comparing sequentially inputted pixel data of said block with the predetermined value relating to said block to set a new predetermined value and store the new predetermined value in said first and second memory means in accordance with the comparison result;

first process means for halftone processing the pixel data from said input means;

second process means for non-halftone processing the pixel data from said input put means;

first buffer means for delaying the pixel data processed by said first process means;

second buffer means for delaying the pixel data processed by said second process means, said second buffer means being different from said first buffer means; and select means for selecting one of the processed data from said first and second buffer means in accordance with the first and second predetermined values stored in said first and second memory means, respectively, wherein each of said first and second buffer means is capable of storing the processed pixel data of plural lines associated with the block so as to delay the processed pixel data in correspondence to extracting operation of said extracting means.

28. An apparatus according to claim 27, wherein said first and second process means perform halftone process and non-halftone process of the pixel data of m bits ($m > 1$) from said input means to output processed pixel data of one bit, respectively.

29. An apparatus according to claim 28, wherein said select means includes discrimination means for discriminating whether the pixel data from said input means represents a halftone image or non-halftone image in accordance with the first and second predetermined values and selects one of the processed pixel data from said first and second buffer means in accordance with the result by said discrimination means.

30. An apparatus according to claim 28, wherein said first process means includes dither process means for performing dither conversion of said pixel data by using a predetermined threshold matrix and said second process means includes means for binarizing said pixel data by using a fixed threshold.

31. An apparatus according to claim 29, wherein said discrimination means discriminates whether the pixel data from said input means represents a halftone image or non-halftone image for each block, and wherein said predetermined value is a minimum value or maximum value of the pixel data in said block.

32. An apparatus according to claim 29, wherein said first and second buffer means delay the processed pixel data correspondingly to discriminating operation by said discrimination means.

* * * * *

UNITED STATES PATENT AND TRADEMARK OFFICE
CERTIFICATE OF CORRECTION

PATENT NO. : 4,924,509

DATED : May 8, 1990

INVENTOR(S) : YOSHIKAZU YOKOMIZO

Page 1 of 2

It is certified that error appears in the above-identified patent and that said Letters Patent is hereby corrected as shown below:

Title page:

IN [56] REFERENCES CITED

U.S. PATENT DOCUMENTS, "Tsuii et al." should read --Tsuji et al.--.

SHEET 2 OF 8

FIG. 2, "SUB-TRACTOR" should read --SUB-TRACTER--.

COLUMN 2

Line 8, "0" should be deleted.

COLUMN 5

Line 17, "MMV" should read --MMVD--.
Line 41, "a" should read --as--.

COLUMN 7

Line 15, "5" should be deleted.

UNITED STATES PATENT AND TRADEMARK OFFICE
CERTIFICATE OF CORRECTION

PATENT NO. : 4,924,509

DATED : May 8, 1990

INVENTOR(S) : YOSHIKAZU YOKOMIZO

It is certified that error appears in the above-identified patent and that said Letters Patent is hereby corrected as shown below:

COLUMN 15

Line 4, "input put means" should read --input means--.

Signed and Sealed this

Thirtieth Day of October, 1990

Attest:

HARRY F. MANBECK, JR.

Attesting Officer

Commissioner of Patents and Trademarks